(12) United States Patent
Fan Jiang et al.

(10) Patent No.: US 8,340,505 B2
(45) Date of Patent: Dec. 25, 2012

(54) METHOD OF PROCESSING AUDIO-VIDEO DATA

(75) Inventors: Shih-Wu Fan Jiang, Taipei County (TW); Jian-Nan Guan, Taipei County (TW)

(73) Assignee: Vivotek Inc., Taipei County (TW)

( * ) Notice: Subject to any disclaimer, the term of this patent is extended or adjusted under 35 U.S.C. 154(b) by 658 days.

(21) Appl. No.: 12/605,190

(22) Filed: Oct. 23, 2009

(65) Prior Publication Data

US 2011/0097058 A1    Apr. 28, 2011

(51) Int. Cl.
*H04N 5/78* (2006.01)
*H04N 5/92* (2006.01)
*H04N 5/917* (2006.01)
*H04N 5/84* (2006.01)
*H04N 5/89* (2006.01)

(52) U.S. Cl. ........ 386/324; 386/326; 386/329; 386/330; 386/331; 386/332; 386/334; 386/335; 386/336

(58) Field of Classification Search .................. 386/324, 386/326, 329, 330, 331, 332, 334, 335, 336
See application file for complete search history.

(56) References Cited

U.S. PATENT DOCUMENTS

2006/0233533 A1* 10/2006 Hosoya .......................... 386/111
2009/0067818 A1* 3/2009 Tokunaka et al. ............. 386/124

FOREIGN PATENT DOCUMENTS

JP    2004007075 A  *  1/2004

OTHER PUBLICATIONS

Maching Translation of JP 2004007075, Tatsuya et al, May 3, 2002.*
ISO/IEC 14496-12 8.8 Movie Fragments, Annex A.8, and Annex C.7, 2008, pp. 91, 92, 43-50, 97.

* cited by examiner

*Primary Examiner* — Daquan Zhao
(74) *Attorney, Agent, or Firm* — Morris Manning & Martin LLP; Tim Tingkang Xia, Esq.

(57) ABSTRACT

An audio-video processing method is adapted to an audio-video device and a storage device for processing an index-based audio-video file. The method for processing audio-video data includes a write procedure, a play procedure, and/or a repair procedure. In the write procedure, audio-video data is captured by the audio-video device first, and the audio-video data includes a plurality of continuous samples; a header is written according to the audio-video data; a predetermined number of samples are captured as a data chunk; a prefix index corresponding to the data chunk and the data chunk are written in sequence repeatedly according to the audio-video data; and a file index is written finally. In the play procedure, after the header is read, corresponding prefix index and data chunk are repeatedly read and played. Moreover, in the repair procedure, incompletely written file index and data chunk are repaired through all the prefix indexes.

14 Claims, 8 Drawing Sheets

METHOD OF PROCESSING AUDIO-VIDEO DATA

BACKGROUND OF THE INVENTION

1. Field of the Invention

The present invention relates to a method for processing audio-video data, and more particularly, to a method for writing, real-time playing, and repairing audio-video data and audio-video files.

2. Related Art

With the development of technology nowadays, audio-video multimedia has been widely used for either entertainment or utility. Video or audio data is indispensable either in movie, advertisement, environment security monitoring system or in medical surgery camera system. The audio-video media is developed to have various file formats, among which the most commonly seen package format is an index-based file format. The package format of the index-based audio-video file mostly has three portions, namely a header, a body, and an index. The portion of the header records basic information of the file, the portion of the body records actual content of the audio-video data, and the portion of the index records a position where the content of the audio-video data is stored in the body.

The index-based file format includes, for example, an audio video interleave (AVI) format developed by Microsoft Corporation and a Third Generation Presence (3GP) format mainly applied on portable electronic devices. The index-based package format is compatible with various standards of the audio-video data such as moving picture experts group (MPEG), motion joint photographic experts group (MJPG), or advanced audio coding (AAC), and thus is widely used in the field of audio-video multimedia. However, when the data is written to form the file, the index is finally written. That is to say, the index cannot be written until the header and the body are completely written into the audio-video file. However, when the index-based file is being played, the audio-video information in the body should be read through the content of the index. Thus, the index-based file cannot be played before being completely written and packaged as a complete file. Being limited by such a structure, the file of index-based format has the problem of failing to play before the file is completely written. In other words, the problem of failing to record and play at the same time and realize the record-and-play function exists.

In addition, if the index-based audio-video file is damaged by an unexpected interrupt during the process of forming the file, the whole audio-video file cannot be used. If the audio-video data and index located at the end of the file have not been written or not completely written, the file cannot be played. Such a kind of incomplete file cannot be repaired, so that the previously captured audio-video data is all in vain.

SUMMARY OF THE INVENTION

In view of the aforementioned problems, the present invention provides a method for processing audio-video data, which is capable of playing an audio-video file that has not been completely written, and repairing the incompletely written audio-video file.

The present invention provides a method for processing audio-video data, adapted to an audio-video device and a storage device for processing an index-based audio-video file. The method of processing audio-video data includes a write procedure. In the write procedure, audio-video data is captured by the audio-video device, and the audio-video data includes a plurality of continuous samples. Further, in the write procedure, a header is written in the audio-video file according to the audio-video data, and the audio-video file is stored in the storage device; then a predetermined number of samples are captured as a data chunk, and a prefix index and the data chunk are written in sequence at the end of a position where the audio-video file is written previously according to the data chunk. The step of writing the prefix index and the data chunk in sequence is repeated, until the audio-video data is completely written into the storage device. Finally, according to the audio-video data or all the prefix indexes, a file index is written at the end of the position where the audio-video file is written previously.

The prefix index corresponding to the data chunk includes: a prefix start position, a prefix sample size, a prefix sample number, and a prefix sample timestamp. Moreover, the file index includes a data chunk start position, a sample size, a sample number, and a sample timestamp corresponding to the file index. The first prefix index of the audio-video file further includes codec information. The prefix index further includes intelligent video information, for storing information required for intelligent video. Furthermore, the prefix index further includes an information verification code for ensuring the correctness of data.

The method for processing audio-video data further includes a play procedure provided for a playing device to play the index-based audio-video file. The play procedure includes: reading the header; reading the prefix index; reading the prefix index and playing the samples of the data chunk corresponding to the prefix index according to the prefix index by the audio-video device; and repeating the steps of reading the prefix index and playing the samples corresponding to the prefix index in sequence, until all the prefix indexes and corresponding samples are read and played.

Furthermore, the method of processing audio-video data includes a repair procedure for repairing an incompletely written index-based audio-video file. The repair procedure includes: checking whether the data chunk corresponding to the last prefix index is complete or not according to the last prefix index; repairing the last data chunk if the checking result indicates that the data chunk corresponding to the last prefix index is incomplete; and writing the file index at the end of the last data chunk according to all the prefix indexes.

The step of repairing the last data chunk includes: deleting the last data chunk that is damaged due to being incompletely written and the prefix index corresponding to the data chunk. The step of repairing the last data chunk further includes: deleting the damaged sample of the data chunk that is damaged due to being incompletely written; and modifying the prefix index corresponding to the last damaged data chunk, according to the last damaged data chunk from which the damaged sample is deleted.

The write procedure, the play procedure, and the repair procedure provided in the present invention may be individually executed, or the plurality of procedures can be executed integrally. For example, the write procedure and the play procedure may be executed at the same time for providing a record-and-play function. For another example, after the file is written, the repair procedure is executed before the audio-video file is played, so as to ensure the integrity of the file.

Based on the above, in the present invention, the prefix index corresponding to each data chunk is interposed between the bodies of the index-based audio-video file, such that the playing device may be notified of the information such as the positions of the data chunk and the sample through the prefix index and play the file without reading the file index at the aftermost end of the file. Moreover, the damaged audio-video file may be repaired by re-writing the file index through the prefix indexes.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention are described below in great detail, the content of the detailed description is sufficient for persons skilled in the art to understand the technical content of the present invention and to implement the present invention there accordingly. Based upon the content of the specification, the claims, and the drawings, persons skilled in the art can easily understand the relevant objectives and advantages of the present invention.

Figure 1A:
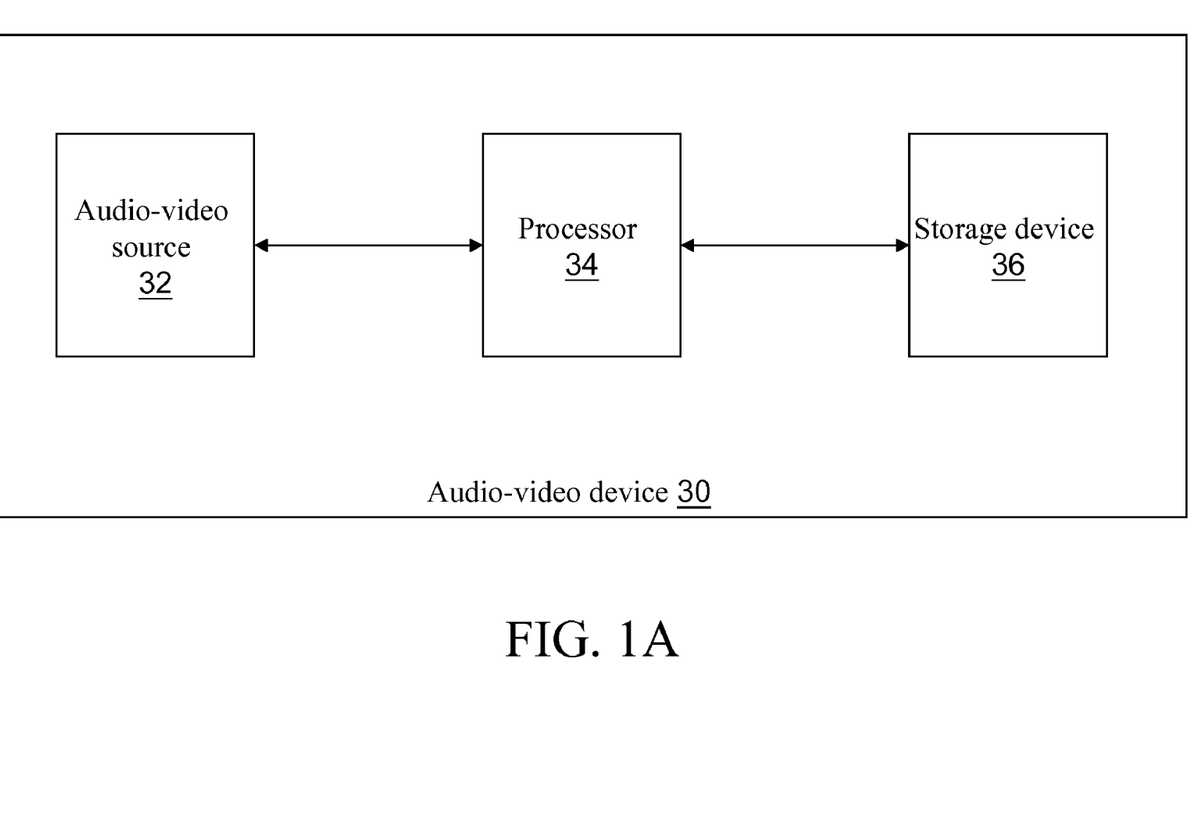
FIG. 1A is a schematic structural view of a device according to an embodiment of the present invention.
Figure 1B:
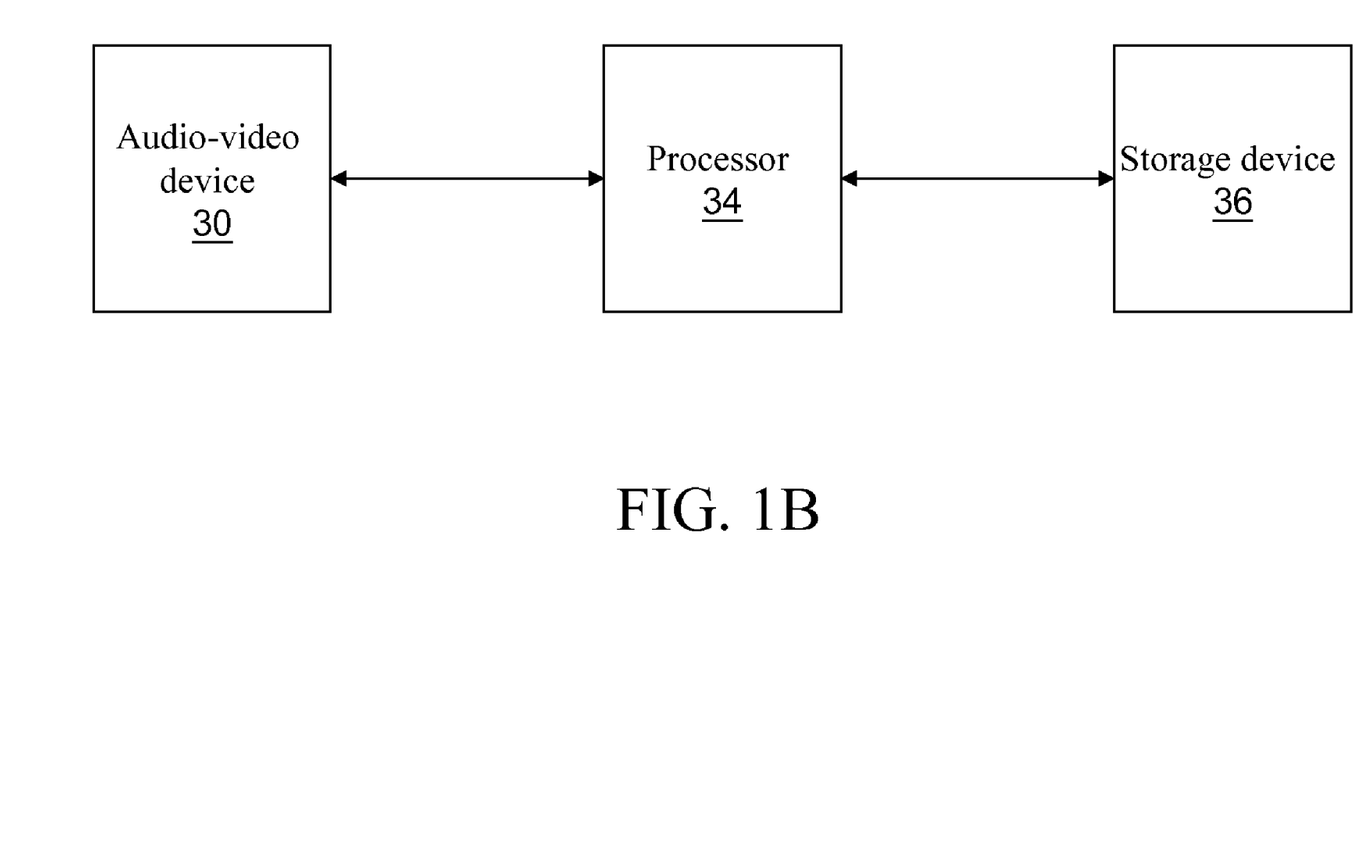
FIG. 1B is a schematic structural view of a device according to another embodiment of the present invention.

Referring to FIG. 1A and FIG. 1B, a schematic structural view of a device according to an embodiment of the present invention and a schematic structural view of a device according to another embodiment of the present invention are respectively shown. The method of processing audio-video data provided in the present invention is adapted to an audio-video device 30 and a storage device 36 for processing an index-based audio-video file. As can be seen from FIG. 1A, the audio-video device 30 includes an audio-video source 32, a processor 34, and the storage device 36. The audio-video source 32 is a device for providing a source of audio-video data, and is, for example, a video recorder, an optical disk drive, a computer connected to the network, or a computer having an audio-video file. The processor 34 executes the method provided by the present invention, and is, for example, a CPU of a computer, or a micro-processor provided in the audio-video device 30. The storage device 36 is a device or a medium providing a space into which the audio-video file is written, e.g., a memory, a hard disc, or an optical disc. For instance, the audio-video device 30 may be a server providing a video camera as the audio-video source 32.

It can be known from the structure of the device in another embodiment as shown in FIG. 1B, the audio-video device 30 used in the present invention may not have the processor 34 and the storage device 36 built-in, but is connected externally thereto. For example, the audio-video device 30 may be a video camera connected to a computer host, and the computer host has a CPU and a memory therein respectively used as the processor 34 and the storage device 36. Based on the above, the method of processing audio-video file provided by the present invention may be executed by the processor 34 configured in the audio-video device 30, or may be executed by an externally connected data processing unit.

Figure 2:
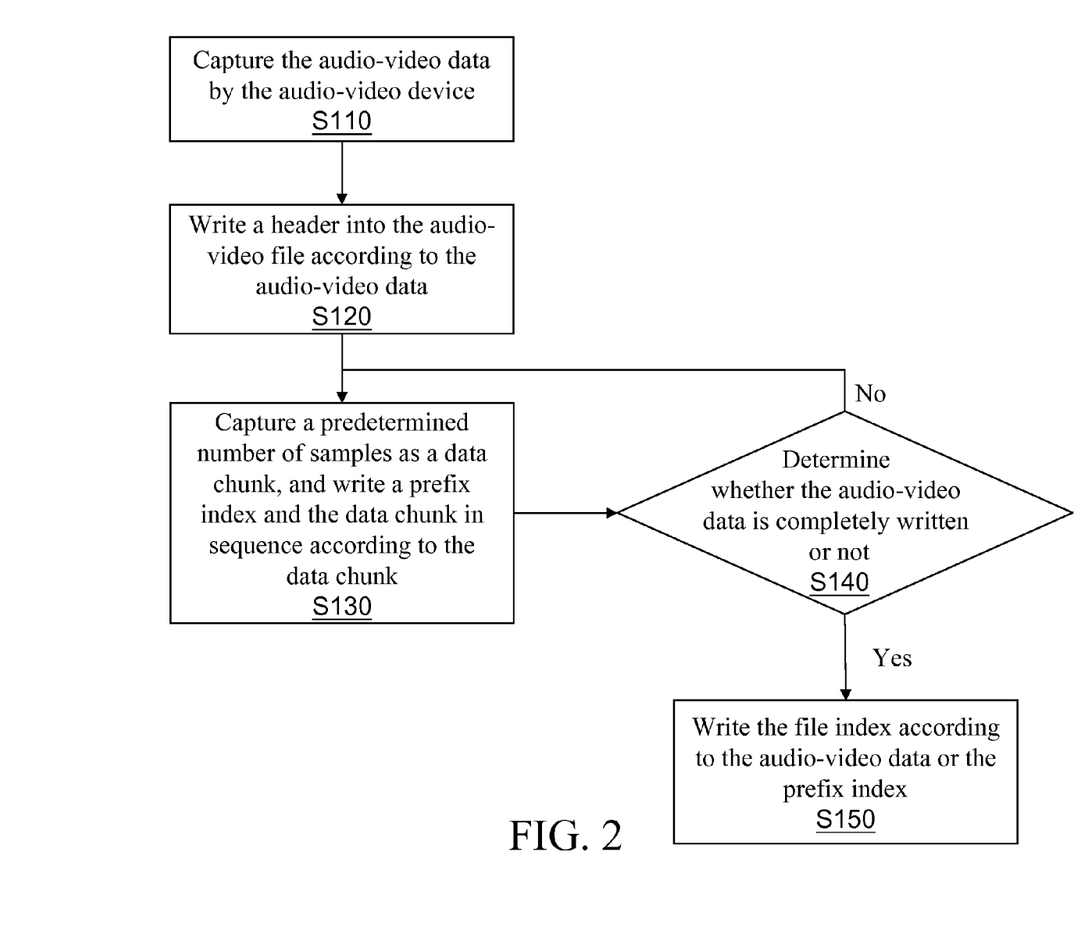
FIG. 2 is a schematic flow chart of a write procedure according to the present invention.
Figure 3:
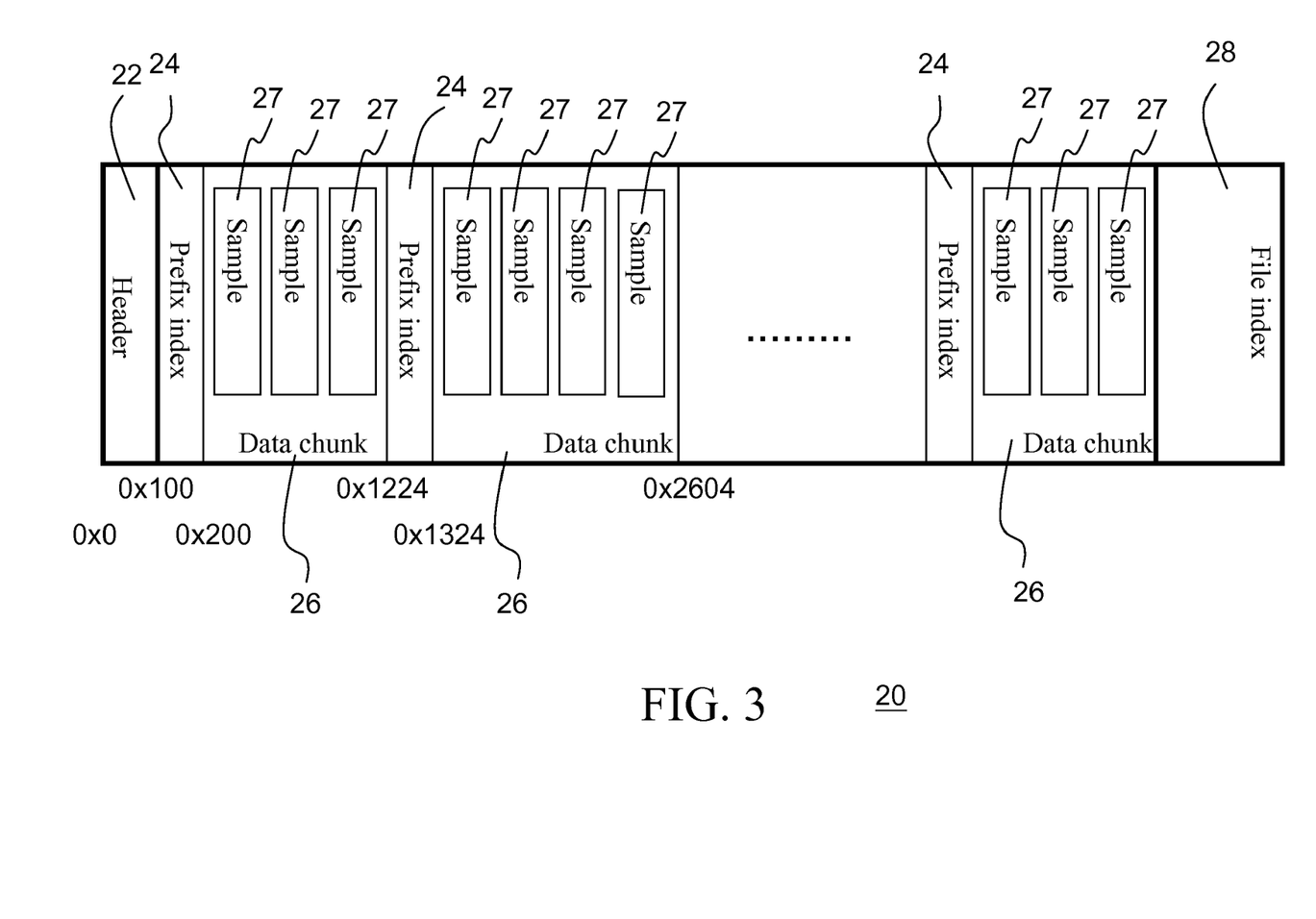
FIG. 3 is a schematic structural view of a video file according to the present invention.

The method for processing audio-video data according to the present invention includes a write procedure, and may further include a play procedure or/and a repair procedure. Referring to FIG. 2 and FIG. 3, a schematic flow chart of the write procedure according to the present invention and a schematic structural view of a video file according to the present invention are respectively shown. As can be seen from FIG. 2, the write procedure includes the following steps. In step S110, the audio-video data is captured by the audio-video device 30. In step S120, according to the audio-video data, a header 22 is written into the audio-video file 20. In step S130, a predetermined number of samples 27 are captured as a data chunk 26, and according to the data chunk 26, a prefix index 24 and the data chunk 26 are written in sequence. In step S140, it is determined whether the audio-video data is completely written or not. In step S150, according to the audio-video data or all the prefix indexes 24, a file index 28 is written.

In the step S110, the audio-video device 30, such as a video recorder, is used to capture the audio-video data. The audio-video data is usually a bit stream, and includes a plurality of continuous samples 27. The sample 27 is digitized content of the audio-video data, and the actual content and format of the samples 27 differ according to the format of the applied audio-video file 20. For example, each frame in the MPEG file is one of the sample 27. According to the write procedure of the present invention, if the audio-video device 30 is a video recorder, the write procedure is a real-time write procedure.

Next, according to the audio-video data and settings when the audio-video device 30 captures the audio-video data, in the step S120, the header 22 is written into the audio-video file 20, and the audio-video file 20 is stored in the storage device 36. Content of the header 22 includes the basic data regarding the frame rate of the audio-video data or the length/width of the video, and the detailed content differs according to the file format (e.g., AVI or 3GP).

Then in the step S130, the audio-video device 30 captures a predetermined number of the samples 27 as the data chunk 26. The predetermined number is, for example, a fixed value, or a varying number that allows each data chunk 26 to have the same size of data amount. According to the present invention, the number of the samples 27 in each data chunk 26 is not limited, and can be determined according to each file format.

After capturing the samples 27 as the data chunk 26, the write procedure writes the prefix index 24 corresponding to the data chunk 26 and the data chunk 26 itself into the audio-video file 20 in sequence at the end of a position where the audio-video file 20 is previously written. More specifically, as shown in FIG. 3, in the step S120, after the header 22 is written into the position from 0x0 to 0x100, the first written prefix index 24 is recorded at the position from 0x100 to 0x200 and is adjacent to the header 22. The corresponding data chunk 26 is recorded at the position from 0x200 to 0x1224 adjacent to the first prefix index 24. The so-called "the end of the position where the audio-video file 20 is previously written" is viewed from the whole audio-video file 20. For example, after the header 22 is written, the end of the position where the audio-video file 20 is previously written is the aftermost end 0x100 of the header 22. However, actually, the data of the audio-video file 20 may be placed in different blocks in the storage device 36 (e.g., a memory or an optical disc), instead of being adjacent to each other. Such a circumstance still falls within the scope of the present invention.

The prefix index 24 includes a prefix start position (offset), a prefix sample size, a prefix sample number, and a prefix sample timestamp, corresponding to the captured data chunk 26. The prefix start position records a position of a start point of each data chunk 26 in the audio-video file 20. For example, the first prefix index 24 in FIG. 3 records that the first data chunk 26 starts at 0x200. The prefix sample size records the sizes of the samples 27 included in the data chunk 26 in sequence, and the prefix sample number records the number of the samples 27 included in the data chunk 26. The size of the data chunk 26 can be known from the prefix sample size and the prefix sample number; and which portion in the whole audio-video file 20 the data chunk 26 belongs to can be defined by the size of the data chunk in combination with the prefix start position. For example, the size of the first data chunk 26 is calculated as 1024 bytes, and it is known that the prefix start position of the first data chunk 26 is 0x200, so it can be defined that the first data chunk 26 is located from 0x200 to 0x1224 in the audio-video file 20.

The prefix sample timestamp records a position of each sample 27 on a time axis when the audio-video file 20 is played, for example, the prefix sample timestamp may be recorded as "02:16:57". Moreover, the prefix index 24 further includes codec information. The codec information is used to designate a codec, and records parameters required by the codec information for the use of playing the file.

Once a group of corresponding prefix index 24 and data chunk 26 are written, the write procedure determines whether the audio-video data is completely written into the audio-video file 20 in the step S140. If the audio-video data has not been completely written into the audio-video file 20, the steps of capturing the sample 27 and writing the prefix index 24 and the data chunk 26 in sequence are repeated, until the audio-video data is completely written into the audio-video file 20.

If the audio-video data has been completely written into the audio-video file 20, the write procedure writes the file index 28 into the audio-video file 20 according to the audio-video data or the prefix index 24 in the step S150, so as to complete the write procedure. The file index 28 is adjacent to the last data chunk 26, and is located at the aftermost end of the whole audio-video file 20. The file index 28 includes a data chunk start position, a sample size, a sample number, and a sample timestamp. The data chunk start position records start positions of all the data chunks 26 in the audio-video file 20. The sample size and the sample number respectively record sizes and number of the samples 27 in each data chunk 26, and the sample timestamp records positions of all the samples 27 on a time axis when the audio-video file 20 is played.

Moreover, the file index 28 further includes codec information for designating a codec and parameters required by the codec for the use of playing. When the frame (i.e., the sample 27) of the used audio-video data format has a plurality of types, the necessary relevant information for the use of playing such as the type name of the frame must be written into the prefix index 24. For example, the frame type of the MPEG file may be I type, P type, or B type, and the frame type corresponding to each sample 27 needs to be recorded in the prefix index 24.

The size of each data chunk 26 can be known from the sample size and the sample number; and which portion in the whole audio-video file 20 each data chunk 26 belongs to can be defined by the size of the data chunk 26 in combination with the data chunk start position. It should be noted that, since a corresponding prefix index 24 is respectively written before each data chunk 26, the data chunk start position is not the start position of the previous data chunk 26 plus the size of the data chunk 26, but further plus the size of the prefix index 24. For example, when the size of the header 22 is 100 bytes, the sizes of the first prefix index 24 and the second prefix index 24 are both 100 bytes, and the size of the first data chunk 26 is 1024 bytes, the data chunk start position of the second data chunk 26 is not 0x1124, but 0x1124 further plus the sizes of the first prefix index 24 and the second prefix index 24, i.e., 0x1324.

Since the present invention does not limit the size of the prefix index 24, the size of the prefix index 24 may be a value that is flexibly variable according to the content, or may also be a fixed value for the convenience of setting. Therefore, the write procedure writes the file index 28 according to the sizes of the audio-video data and the prefix index 24, or directly integrates the content of all the prefix indexes 24 and writes the content into the file index 28.

According to the write procedure provided in the present invention, the source of the audio-video data may be an audio-video data stream provided by a video recorder or network, or may also be a bit stream produced when another audio-video file is played. For example, the write procedure according to the present invention may be applied to file converter software, for rewriting files of a normal index-based format as an audio-video file 20 having the prefix index 24. Thus, the play procedure and the repair procedure provided by the present invention may also be performed on the converted audio-video file 20.

The method for processing audio-video data according to the present invention further includes the play procedure provided for a playing device to play an audio-video file. The playing device has the play procedure provided in the present invention, and is capable of reading the prefix index 24 and playing the audio-video file 20 according to the prefix index 24.

Figure 4:
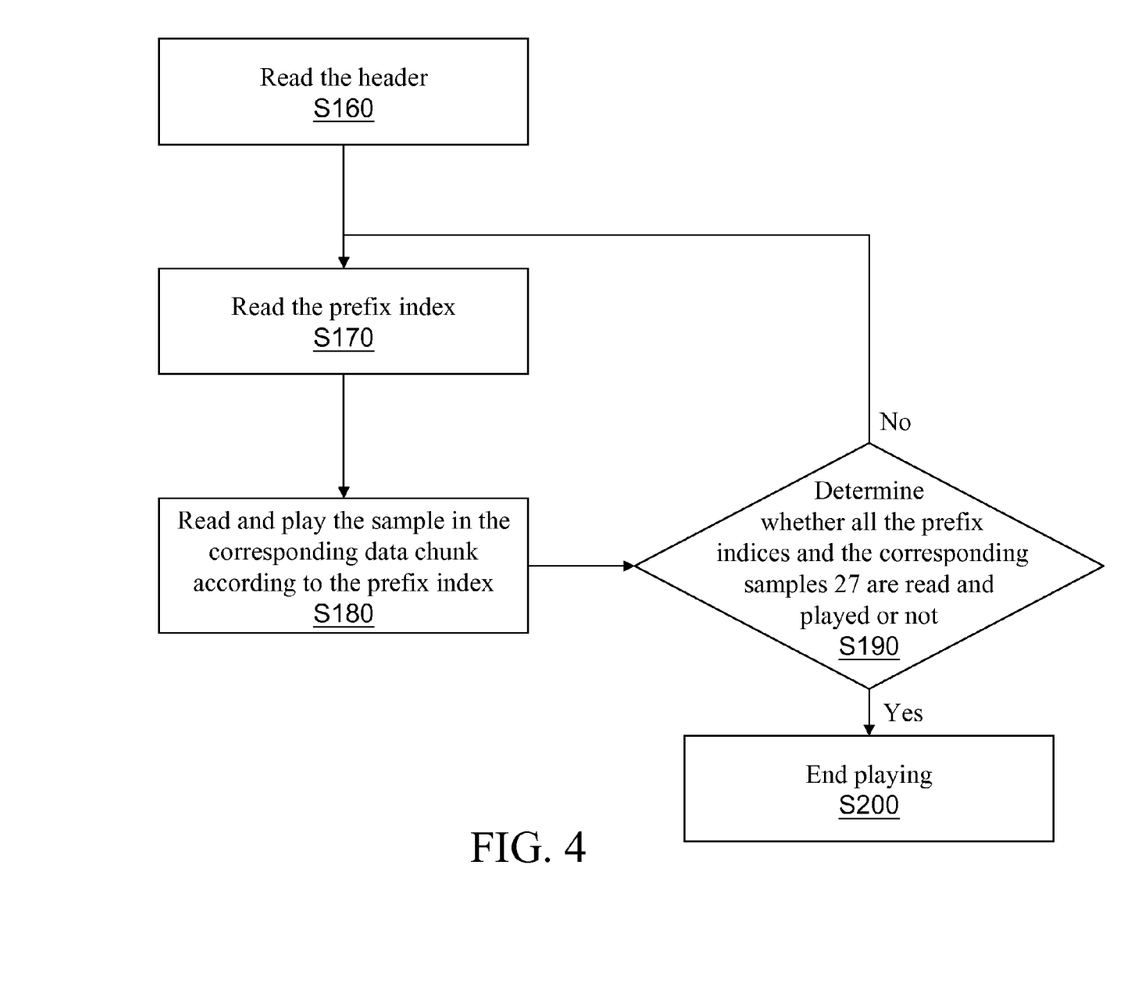
FIG. 4 is a schematic flow chart of a play procedure according to the present invention.

Referring to FIG. 4, a schematic flow chart of a play procedure according to the present invention is shown. As can be seen from FIG. 4, the play procedure includes the following steps. In step S160, the header 22 is read. In step S170, the prefix index 24 is read. In step S180, the prefix index 24 is read and the sample 27 of the corresponding data chunk 26 is played according to the prefix index 24. In step S190, it is determined whether all the prefix indexes 24 and the corresponding samples 27 are read and played or not. In step S200, the playing is ended.

In the step S160, the play procedure firstly reads the header 22. The play procedure provides the basic data of the audio-video file 20 written in the header 22 to the playing device, e.g., the playing rate and picture size of the audio-video file 20. After the header 22 is read, in the step S170, the prefix index 24 adjacent to the header 22 is read.

By reading prefix index 24, the play procedure knows codec information and information of the data chunk 26 corresponding to the prefix index 24. According to the read prefix index 24, the play procedure reads and plays the sample 27 of the data chunk 26 corresponding to the prefix index 24 in the step S180. For example, the prefix start position where the corresponding data chunk 26 is recorded in the first prefix index 24 0x200, the sample 27 is read and played from 0x200 according to the size of the first sample 27 as recorded by the prefix sample size. Furthermore, the play procedure reads the prefix index 24, but the content in the prefix index 24 will not be played as an image.

Once a group of corresponding prefix index 24 and data chunk 26 are read, the play procedure determines whether all the samples 27 of the data chunk 26 and the corresponding prefix indexes 24 in the audio-video file 20 have been read and played or not in the step S190. If there are the prefix index 24 and the data chunk 26 that have not been read and played in the audio-video file 20, the step of reading the subsequent prefix index 24 and corresponding data chunk 26 is repeated. Until all the prefix index 24 and the data chunk 26 in the audio-video file 20 have been read and played, the play procedure is ended in the step S200. Besides the audio-video file 20 has been completely played, the play procedure may also pause playing or stop playing according to the instruction of the user. Likewise, the play procedure may also repeat playing the audio-video file 20 according to the instruction of the user.

A common playing device that does not have the play procedure provided by the present invention can also play through the file index 28 of the complete audio-video file 20. Since the data chunk start position has been adjusted according to the prefix index 24 during writing, the conventional playing device (or the play procedure and player) cannot read the prefix index 24, but can play the audio-video file 20 in the manner of playing normal files.

Since each prefix index 24 has the information required for playing the corresponding data chunk 26, the play procedure can play the existing prefix index 24 and the corresponding data chunk 26 without reading the file index 28 at the aftermost end of the audio-video file 20. In such a manner, even the audio-video file 20 is not completely written, the play procedure still can play the written portion in the audio-video file 20. In other words, after the header 22 and the first group of corresponding prefix index 24 and data chunk 26 are written, the write procedure and the play procedure of one audio-video file 20 can be executed at the same time, i.e., a record-and-play function is provided.

Figure 5:
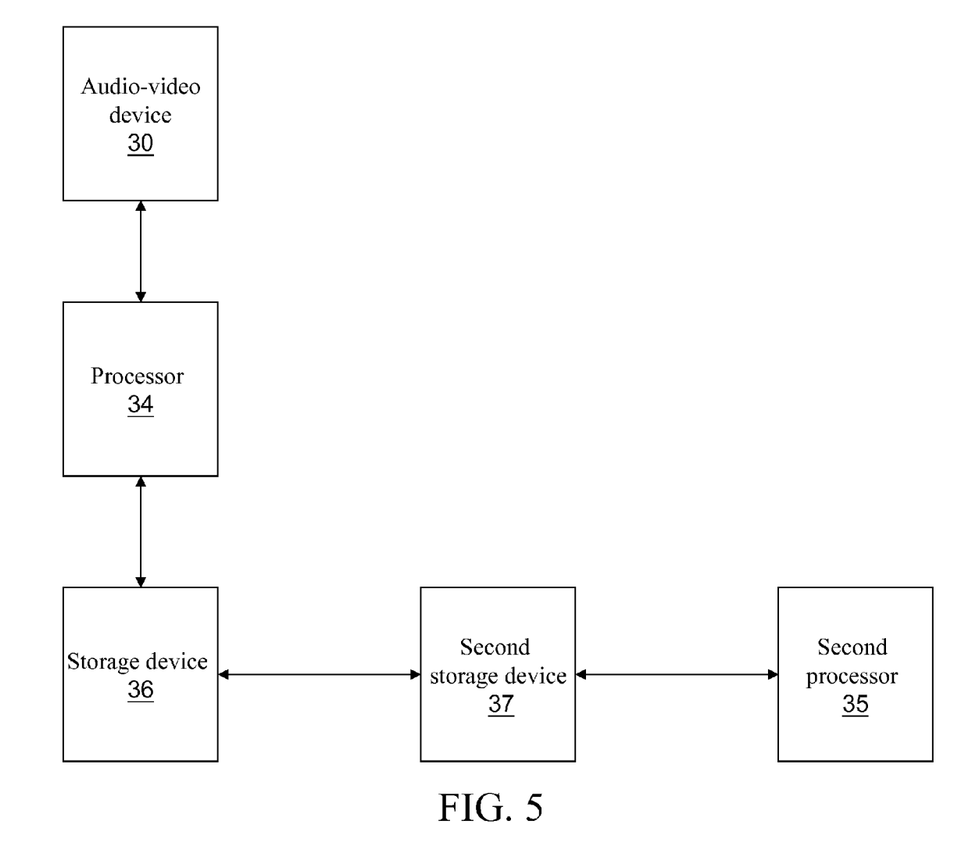
FIG. 5 is a schematic structural view of a record-and-play device according to an embodiment of the present invention.

Referring to FIG. 5, a schematic structural view of a record-and-play device according to an embodiment of the present invention is shown. As shown in FIG. 5, in order to execute the record-and-play function, a second processor 35 is further included. The processor 34 is used to capture the audio-video data through the audio-video device 30 and execute the write procedure, and the second processor 35 is used to execute the play procedure. After writing the audio-video data into a memory used as a storage device 36, the processor 34 stores the audio-video file 20 that is being written into a second storage device 37. The second storage device 37 is a device capable of storing a great amount of file data, e.g., a hard disc or a memory card. When the processor 34 is executing the write procedure, the second processor 35 also executes the play procedure at the same time to read the audio-video file 20 from the second storage device 37 and plays the audio-video file 20 that is still being written.

Furthermore, the play procedure provided in the present invention may also be applied to a network audio-video playing application. By the corresponding prefix index 24 and data chunk 26, even the audio-video file 20 that has not been completely transmitted can also be played by the play procedure. In other words, the receiving end may play the audio-video file 20 when being transmitted.

The method for processing audio-video data according to the present invention further includes the repair procedure for repairing the incompletely written audio-video file 20. During the execution of the write procedure, the audio-video file 20 may be incompletely written due to the accidences such as interrupt of power or malfunction of the audio-video device 30. At this time, in the written audio-video file 20, the last data chunk is usually incomplete, the file index 28 is incomplete or missing. The aforementioned repair procedure is used to repair this kind of incomplete audio-video file 20.

Figure 6A:
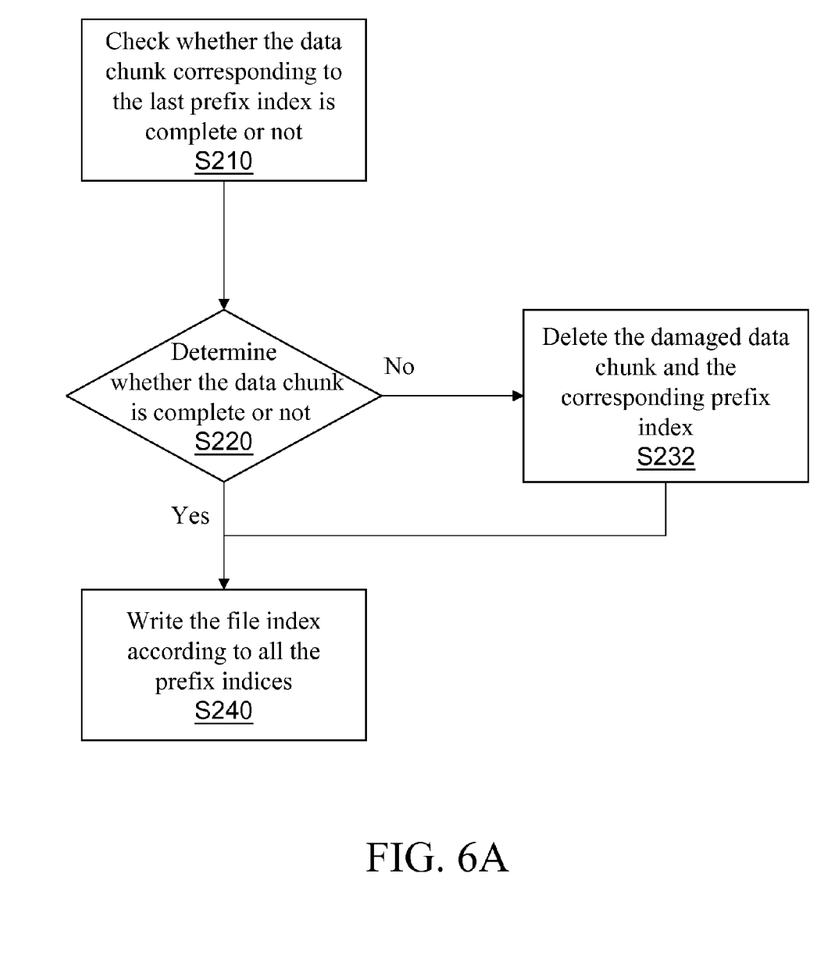
FIG. 6A is a schematic flow chart of a repair procedure according to an embodiment of the present invention.

Referring to FIG. 6A, a schematic flow chart of a repair procedure according to an embodiment of the present invention is shown. It can be known from FIG. 6A, the repair procedure includes the following steps. In step S210, whether the data chunk 26 corresponding to the last prefix index 24 is complete or not is checked. In step S220, it is determined whether the data chunk 26 is complete or not. In step S232, the damaged data chunk 26 and the corresponding prefix index 24 are deleted. In step S240, the file index 28 is written according to all the prefix indexes 24.

In the step S210, the repair procedure reads the last prefix index 24, and checks the corresponding data chunk 26 according to the last prefix index 24. The prefix index 24 records a sample size and a sample number that should be provided in the corresponding data chunk 26, so that the repair procedure can check whether the data chunk 26 (i.e., the last data chunk 26 in the audio-video file 20) corresponding to the last prefix index 24 is complete or not according to the prefix index 24 in the step S220.

If the content of the last data chunk 26 is incomplete, it indicates that, when the audio-video file 20 is being written, at least one sample 27 in the last damaged data chunk 26 is somehow damaged due to the incomplete writing. Thereby, in the step S232, the last damaged data chunk 26 and the corresponding prefix index 24 are deleted, such that the remaining complete portion of the audio-video file 20 can be used.

If the content of the last data chunk 26 is complete, it indicates that only the file index 28 is incompletely written. Thus, when the content of the last data chunk 26 is complete, or the incomplete data chunk 26 (i.e. the last damaged data chunk 26) and its corresponding prefix index 24 are deleted, the repair procedure writes the file index 28 according to all the remaining prefix indexes 24 in the step S240. The repair procedure reads and integrates the data such as the prefix start position, the prefix sample size, the prefix sample number, and the prefix sample timestamp in all the prefix indexes 24, and re-writes the data such as the data chunk start position, the sample size, the sample number, and the sample timestamp in the file index 28 correspondingly. For example, according to the prefix start position, the prefix sample size, the prefix sample number in each prefix index 24, and the size of the prefix index 24, the data chunk start position of the file index 28 can be calculated. All the prefix sample timestamps in each prefix index 24 can be integrally recorded to obtain a sample timestamp. In such a manner, the audio-video file 20 having correct file index 28 is obtained through repairing, and can be played or used as non-damaged data.

Figure 6B:
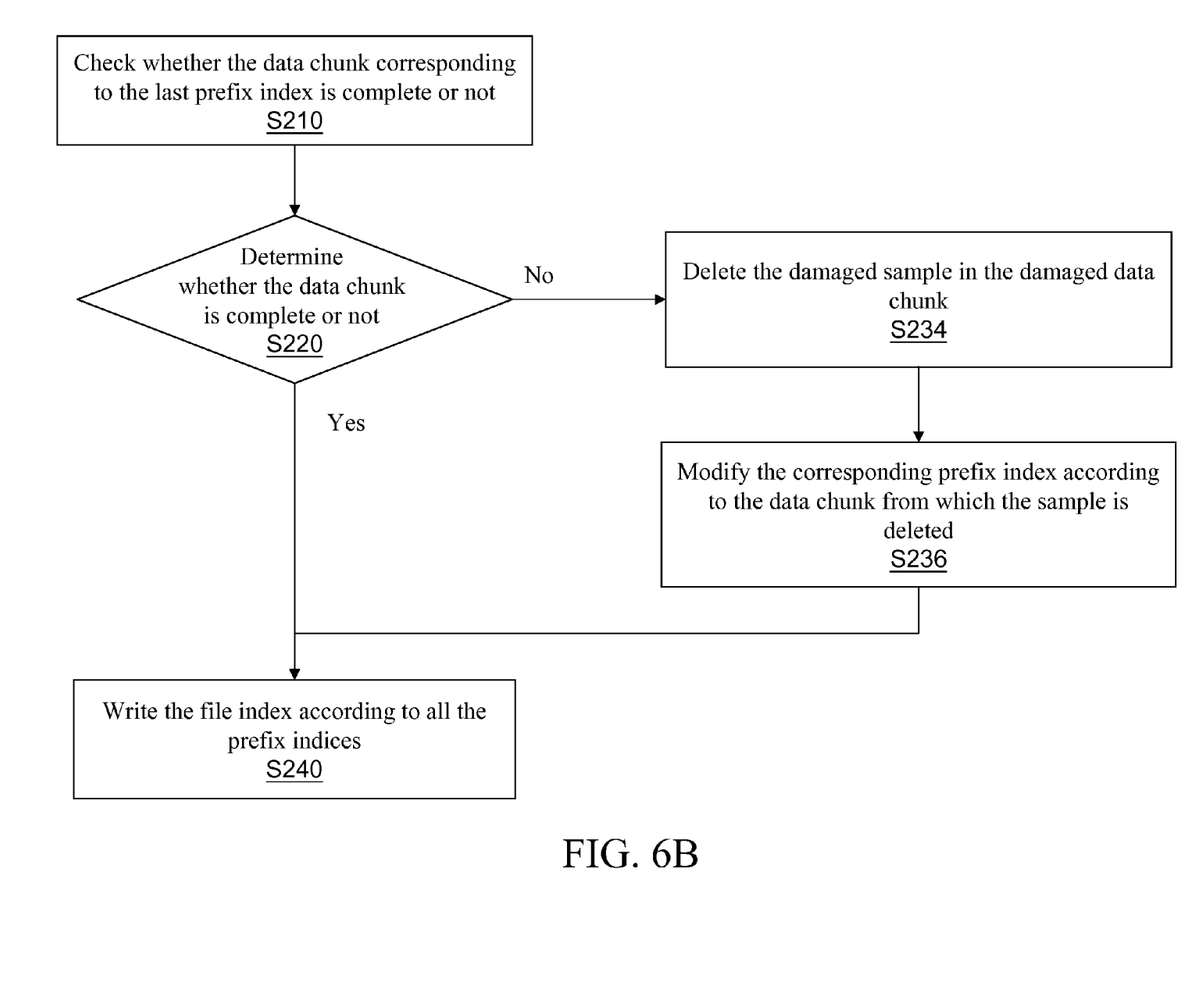
FIG. 6B is a schematic flow chart of a repair procedure according to another embodiment of the present invention.

Referring to FIG. 6B, a schematic flow chart of a repair procedure according to another embodiment of the present invention is shown. It can be known from FIG. 6B, the repair procedure includes the following steps. In step S210, whether the data chunk 26 corresponding to the last prefix index 24 is complete or not is checked. In step S220, it is determined whether the data chunk 26 is complete or not. In step S234, the damaged sample 27 in the last damaged data chunk 26 is deleted. In step S236, the corresponding prefix index 24 is modified according to the last damaged data chunk 26 from which the damaged sample 27 is deleted. In step S240, the file index 28 is written according to all the prefix indexes 24.

This embodiment is different from the previous embodiment in the repairing step. In this embodiment, in the step S234, the repair procedure only deletes the damaged sample 27 in the data chunk 26 instead of deleting whole the last damaged data chunk 26. Thus, in the incomplete data chunk 26, part of the damaged audio-video data is saved for being used. After the damaged sample 27 is deleted, the repair procedure modifies the last prefix index 24 according to the modified data chunk 26 (i.e. the last damaged data chunk 26 that its damaged sample 27 is deleted) in the step S236. The prefix sample size and the prefix sample timestamp of the prefix index 24 that are relevant with the modified data chunk 26 should also be modified, so as to correspond to the modified data chunk 26. Thus, in the last step S240, the repair procedure writes the file index 28 according to all the prefix indexes 24.

In the repair procedure according to the present invention, the incomplete portion in the audio-video file 20 is deleted and the correct file index 28 is re-written, so as to repair the incompletely written audio-video file 20 for being normally played and used.

The write procedure, the play procedure, and the repair procedure performed on the audio-video data and the audio-video file 20 provided in the present invention may be individually executed, or the plurality of procedures can be executed integrally. One example of executing the plurality of procedures integrally is that, the write procedure and the play procedure may be executed at the same time for providing a record-and-play function. For another example, after the file is written, the repair procedure is executed before the audio-video file is played so as to ensure the integrity of the file.

An example of applying the method for processing audio-video file according to the present invention to the conventional format is provided below. Hereinafter a file applied to 3GP format is taken as an example. Regarding the definition of the 3GP format, please refer to the file of International Organization for Standardization/International Electrotechnical Commission (ISO/IEC) 14496-12, which is incorporated into the present invention by reference. According to the definition of 3GP format, the audio-video file 20 is formed by combining the boxes defined in the 3GP format. The header 22 is a file type box (ftyp), which includes multimedia formats used for recording the audio-video file 20, e.g., the information such as 3GP4, 3GP5, ISOM, and JPM. The multimedia format may be, but not limited to, MPEG-2. The body includes the information such as media data box (mdat). The file index 28 is a movie box (moov), for recording the description on the audio-video data. he moov has at least one track box (trak) for storing the data chunk 26, the file index 28 includes fields of a data chunk start position (stco), a sample size (stsz), a sample number (stsz) (note: the sample number can be calculated from stsz), and a sample timestamp (stts). When the present invention is applied to the 3GP format, the prefix index 24 in the audio-video file stored in the processing method for the present invention includes fields of a frame type (I, P, B), a prefix start position, a prefix sample size, a prefix sample number, and a prefix sample timestamp of the sample.

Hereinafter is an example of recording information in the prefix index 24 according to an embodiment of the present invention, and the employed storage format needs not to conform to the standard of ISO/IEC 14496-12.

```
{
4 bytes fourcc;
4 bytes sample_count;
for (i = 1; i <= sample_count; i++) {
    4 bytes sample_size;
    4 bytes sample_time;
    2 bytes sample_timemsec;
}
4 bytes length;
length bytes extension;
}
```

"fourcc" describes the format of the data chunk 26, having 4 bytes.

"sample_count" describes the number of the samples 27 in the data chunk 26, having 4 bytes.

"sample_size" describes the size of each sample 27, being equivalent to the record in the stsz, having 4 bytes.

"sample_time" describes the portion of the prefix sample timestamp that takes second as the unit of each sample 27, having 4 bytes.

"sample_timemsec" describes the portion of the prefix sample timestamp that takes millisecond as the unit of each sample 27, having 2 bytes; the content obtained by combining the sample_time and the sample_timemsec is corresponding to the sample timestamp (stts) field.

"length" describes the length of an extension field, being 0.4 byte if no extension field is provided.

"extension" describes the extension field. The relevant coding information is recorded in the first data chunk 26 with the different fourcc, and is no longer recorded in other data chunk 26. Besides, the prefix index 24 further includes intelligent video information, for storing additional data required for performing intelligent video, e.g., motion window supported by a monitoring video camera. The play procedure reads the prefix index 24, and displays the additional information content according to the intelligent video information. If the information required for storing the motion window is taken as an example, the storage file format of the intelligent video information may be motion window information of 8 bytes, wherein the content of each motion window is:

```
{
2 bytes left;
2 bytes top;
2 bytes right;
2 bytes bottom;
}
```

Thus, the play procedure reads the content of the intelligent video information (i.e., the motion window information), and draws the content on the pictures.

The prefix index 24 further includes an information verification code, for validating the correctness of the data. For example, once a data chunk 26 is written, a Message-Digest Algorithm 5 (md5) is used to calculate, and the calculating result is stored into the corresponding prefix index 24 as the information verification code, so as to ensure the integrity and consistency of the data. In such a manner, the play procedure can check whether the sample 27 in the data chunk 26 is modified or interpolated according to the information verification code.

According to the method for processing audio-video data, the method for playing the audio-video file, and the method for repairing the damaged audio-video file in the present invention, the prefix index corresponding to each data chunk is interposed between the bodies of the audio-video file of an index-based format, such that the playing device needs not to read the file index at the aftermost end of the file, so as to solve the problem of failing to play the file before being completely written. Moreover, the damaged audio-video file may be repaired by re-writing the file index through the prefix index, such that the problem of failing to repair the file that is incompletely written in the conventional art is solved. In addition, when the audio-video file of an index-based format is written, the file index is written according to the prefix index. Therefore, any data can be inserted into the prefix index, without affecting playing the audio-video file by a general play procedure.

Through the method writing the file index based on all prefix index, any additional self-defined data is able to be placed in the prefix index of any index-based format file. In other words, the disclosed invention is adapted to all index-based format files, but not to a specific audio-video format file. The data in the prefix index is undetectable or invisible to the general play procedure, and the audio-video file generated by the write procedure of the present invention can be played by current media players without post processing (without recoding).

What is claimed is:

1. A method for processing audio-video data, adapted to an audio-video device and a storage device for processing an index-based audio-video file, comprising:
a write procedure, comprising:
capturing audio-video data by the audio-video device, the audio-video data comprising a plurality of continuous samples;
writing a header into the audio-video file according to the audio-video data, the audio-video file being stored in the storage device;
capturing a predetermined number of the samples as a data chunk, and writing a prefix index and the data chunk in sequence at the end of a position where the audio-video file is written previously according to the data chunk;
writing the prefix index and the data chunk in sequence repeatedly, until the audio-video data is completely written into the audio-video file; and
writing a file index at the end of a position where the audio-video file is written previously according to the audio-video data or all the prefix indexes, wherein the prefix index comprises a prefix start position, a prefix sample size, a prefix sample number, and a prefix sample timestamp corresponding to the data chunk; the prefix start position, the prefix sample size, the prefix sample number, and the prefix sample timestamp are respectively corresponding to a data chunk start position, a sample size, a sample number, and a sample timestamp of the file index.

2. The method for processing audio-video data according to claim 1, wherein the first prefix index of the audio-video file further comprises codec information.

3. The method for processing audio-video data according to claim 1, wherein the prefix index comprises intelligent video information.

4. The method for processing audio-video data according to claim 1, wherein the prefix index comprises an information verification code.

5. The method for processing audio-video data according to claim 1, further comprising a play procedure, wherein the play procedure comprises:
reading the header;
reading the prefix index;
reading the prefix index and playing the samples of the data chunk corresponding to the prefix index by the audio-video device according to the prefixed index; and
reading the prefix index and playing the samples corresponding to the prefix index in sequence repeatedly, until all the prefix indexes and corresponding samples are read and played.

6. The method for processing audio-video data according to claim 1, further comprising a repair procedure, wherein the repair procedure comprises:
checking whether the data chunk corresponding to the last prefix index is complete or not according to the last prefix index;
repairing the last data chunk if the data chunk corresponding to the last prefix index is incomplete; and
writing the file index at the end of the last data chunk according to all the prefix indexes.

7. The method for processing audio-video data according to claim 6, wherein the step of repairing the last data chunk comprises:
deleting the last damaged data chunk and the prefix index corresponding to the last damaged data chunk.

8. The method for processing audio-video data according to claim 6, wherein the step of repairing the last data chunk comprises:
deleting the damaged sample of the last damaged data chunk; and
modifying the prefix index corresponding to the last damaged data chunk according to the last damaged data chunk from which the damaged sample is deleted.

9. A method for processing audio-video data, adapted to an index-based audio-video file, the audio-video file comprising a header, at least one prefix index, a data chunk corresponding to each of the prefixed index, and a file index in sequence, wherein the data chunk comprises at least one sample, the method comprises a play procedure, and the play procedure comprises:
reading the header;
reading the prefix index;
reading the prefix index and playing the samples of the data chunk corresponding to the prefix index by an audio-video device according to the prefix index; and
reading the prefix index and playing the samples corresponding to the prefix index in sequence repeatedly, until all the prefix indexes and the corresponding samples are read and played, wherein the prefix index comprises: a prefix start position, a prefix sample size, a prefix sample number, and a prefix sample timestamp corresponding to the data chunk; the prefix start position, the prefix sample size, the prefix sample number, and the prefix sample timestamp are respectively corresponding to a data chunk start position, a sample size, a sample number, and a sample timestamp corresponding to the file index.

10. The method for processing audio-video data according to claim 9, wherein the first prefix index of the audio-video file further comprises codec information.

11. A method for processing audio-video data, adapted to an index-based audio-video file, the audio-video file comprises a header, at least one prefix index, a data chunk corresponding to the prefixed index, and a file index in sequence, wherein the data chunk comprises at least one sample, the method comprises a repair procedure, and the repair procedure comprises:
checking whether the data chunk corresponding to the last prefix index is complete or not according to the last prefix index;
repairing the last data chunk if the data chunk corresponding to the last prefix index is incomplete; and
writing the file index at the end of the last data chunk according to all the prefix indexes by an audio-video device, wherein the prefix index comprises: a prefix start position, a prefix sample size, a prefix sample number the prefix start position, the prefix sample size, the prefix sample number, and the prefix sample timestamp are respectively corresponding to a prefix sample timestamp corresponding to the data chunk; and a data chunk start position, a sample size, a sample number, and a sample timestamp corresponding to the file index.

12. The method for processing audio-video data according to claim 11, wherein the step of repairing the last data chunk in the repair procedure comprises:
  deleting the last damaged data chunk and the prefix index corresponding to the last damaged data chunk.

13. The method for processing audio-video data according to claim 11, wherein the step of repairing the last data chunk in the repair procedure further comprises:
  deleting the damaged sample of the last damaged data chunk; and
  modifying the prefix index corresponding to the last damaged data chunk according to the last damaged data chunk from which the sample is deleted.

14. The method for processing audio-video data according to claim 11, wherein the first prefix index of the audio-video file further comprises codec information.

* * * * *